United States Patent Office 3,546,233
Patented Dec. 8, 1970

3,546,233
BIS- AND MONO-QUATERNARY SALTS OF 1-(CY-CLICAMINO)CYCLOPROPACYCLOALKANES
Jacob Szmuszkovicz, Kalamazoo, and Elisabeth Cerda, Portage, Mich., assignors to The Upjohn Company, Kalamazoo, Mich., a corporation of Delaware
No Drawing. Filed May 15, 1967, Ser. No. 638,562
Int. Cl. C07d 29/10
U.S. Cl. 260—293                                      6 Claims

ABSTRACT OF THE DISCLOSURE

Bisquaternary ammonia compounds of the formula

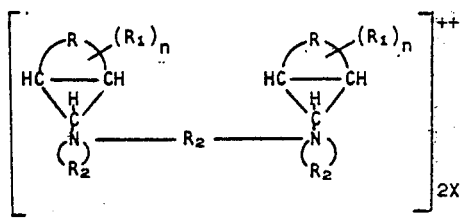

and mono-quaternary ammonia compounds of the formula

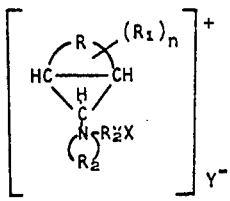

wherein R is polymethylene of 3 to 7 carbon atoms, $R_1$ is alkyl of not more than 2 carbon atoms, $n$ is zero or an integer not greater than 1, $R_2$ is lower alkylene of from 2 to 6 carbon atoms, X is halogen and Y is an anion. These compounds are useful as disinfectants.

BRIEF SUMMARY OF THE INVENTION

The invention relates to bis-quaternary ammonium compounds of the formula

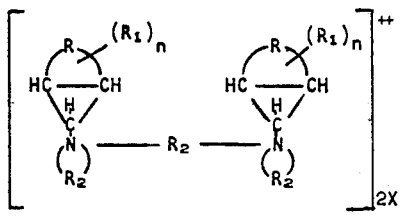

and mono-quaternary ammonium compounds of the formula

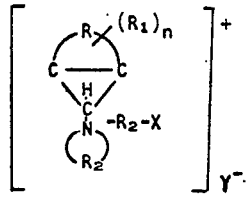

wherein R is polymethylene of 3 to 7 carbon atoms, $R_1$ is alkyl of not more than 2 carbon atoms, $n$ is zero or an integer not greater than 2, $R_2$ is lower alkylene of from 2 to 6 carbon atoms, X is halogen, and Y is an anion. The novel compounds of the invention wherein X is halogen are prepared by a process illustrated by the following equation

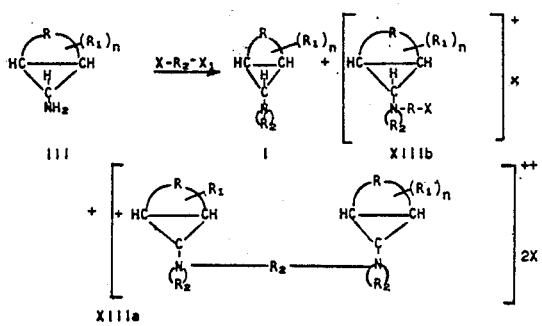

wherein R, $R_1$, $R_2$, $n$, X and Y are the same as above.

Compounds of Formula XIIIc are prepared from compounds of XIIIb by replacing the ionic halogen ($X^-$) of compounds of Formula XIIIb by metathesis.

DETAILED DESCRIPTION

The starting 1-aminocyclopropacycloalkane, Formula II, can be prepared from the corresponding cyclopropacycloalkane-1-carboxylic acid:

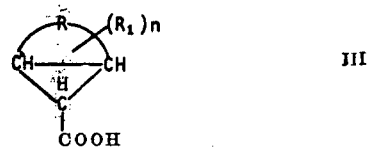

by converting a carboxylic group to an amino group. Any of several well known reactions can be used for this purpose, for example, the Curtius reaction, the Hoffman reaction, the Losen reaction, or the Schmidt reaction (Surrey, Name Reactions in Organic Chemistry, 2nd Ed., 1961, Academic Press) or the Weinstock modifications of the Curtius reaction [Weinstock, J. Org. Chem. 26, 3511 (1946)].

The starting cyclopropacycloalkane-1-carboxylic acids of Formula III can be prepared by reacting a cycloalkene of the formula:

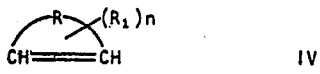

with ethyl diazoacetate to form a compound of the formula:

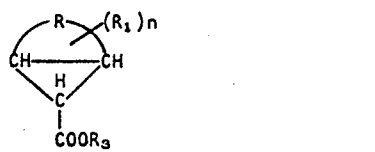

wherein $R_3$ is ethyl and hydrolyzing to the acid, Formula III, or with diazoacetone to form a ketone of the formula:

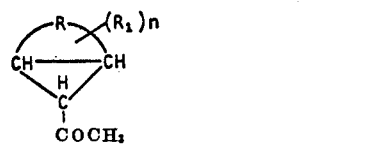

which is then oxidized to the desired cyclopropacycloalkane-1-carboxylic acid. Meinwald et al., J. Am. Chem. Soc. 85, 582–585 (1963).

An advantage of this process is that it produces exclusively, or almost so at least, the exo form which can be represented by the following formula:

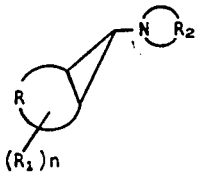

VI

An alternative process produces predominately the endo form:

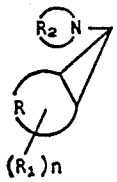

VII

It comprises a borohydride hydrogenolysis of a 1,1-bis-(cyclicamino)cyclopropacycloalkane of the formula:

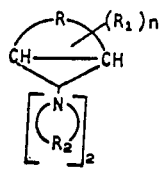

VIII which in turn can be prepared by reacting a 2-halocycloalkanone with a base of the formula

These two processes, therefore, complement one another in providing a facile synthesis of both the endo and exo forms of 1-(cyclicamino)cyclopropacycloalkanes.

The process of the invention can also be used, if desired, for producing 1 - endo - (cyclicamino)cyclopropacycloalkanes. For example, bicyclo[3.1.0]hexane-6-endo-carboxylic acid (Meinwald et al., loc. cit.) can be converted by the procedures outlined above to 6-endo-aminobicyclo [3.1.0]hexane which in turn by the procedures outlined above is converted to 6-endo-(cyclicamino)bicyclo[3.1.0] hexane[1-endo-(cycloicamino)cyclopropacyclohexane].

The endo acid, for example, bicyclo[3.1.0]hexane-6-endo-carboxylic acid, can be converted to the exo form by esterifying, for example, with diazomethane, heating in ethanol in the presence of sodium ethoxide to convert to the exo ester and hydrolyzing this ester. The exo form can also be converted to the endo form by the same process but the yield is low because the equilibrium favors the exo form.

A further advantage of the process of the invention is that useful by-products are produced. For example, when the acid azide of a cyclopropacycloalkane-1-carboxylic acid of Formula III is alcoholized, for example with an alkanol, to a carbamate of formula:

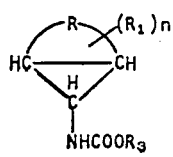

IX where $R_3$ is the radical of the alcohol used in the alcoholysis, for example, lower alkyl, such as methyl, ethyl, propyl, butyl, isobutyl and the like, there is also obtained a urea of the formula:

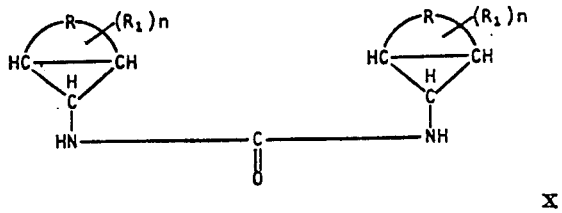

X

The urea of Formula X can be converted to an isocyanate of the formula:

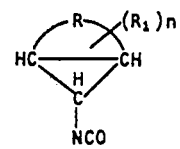

XI by phosgenating it to form an allophanyl chloride of the formula:

XII which on heating is converted to two moles of an isocyanate of Formula XI.

The isocyanate of Formula XI can be recycled in the process to produce more carbamate of Formula IX or it can be hydrolyzed directly to an amine of Formula II. It can also be reacted according to U.S. Patent 2,968,158 with a benzenesulfonamide, for example para-toluenesulfonamide, to form an N-benzenesulfonyl-N'-cyclopropacycloalkylurea, for example N-(p-methylbenzenesulfonyl)-N'-(bicyclo[3.1.0]hex-6-yl)urea which is useful as a hypoglycemic agent.

Also when an amine of Formula II is reacted with a dihalide of the formula $X-R_2-X$, there are also obtained bisquaternary ammonium compounds of the formula:

XIIIa and mono-quaternary ammonium compounds of the formula:

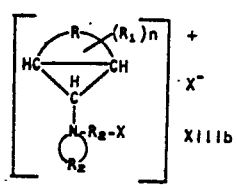

XIIIb

The ionic halogen ($X^-$) can be replaced by metathesis by other anions, for example, the anions of the acids listed hereinafter. The mono- and bis-quaternary ammonium compounds have antibacterial properties, making them useful as disinfectants.

The conversion of the 1-aminocyclopropacycloalkanes to 1-(cyclicamino)cyclcloalkanes is effected by heating the free base 1-aminocyclopropacycloalkane with a dihalide of the formula X–R$_7$–X as described above in an inert solvent in the presence of a scavenger for the hydrogen halide liberated, for example, an inorganic base such as alkali metal carbonates and hydroxides, or organic tertiary bases such as triethylamine and pyridine. An excess of the dihalide is advantageously used and the reaction mixture is heated to between about 50° C. and about 150° C. The solvent, for example, can be ether, acetone, methanol, ethanol, dioxane, tetrahydrofuran, or dimethylformamide. An excess of the dihalide can replace the solvent wholly or in part.

Suitable starting cyclopropacycloalkane - 1-carboxylic acids of Formula III include: bicyclo[3.1.0]hexane-6-exo-carboxylic acid, bicyclo[4.1.0]heptane-7-exo-carboxylic acid, bicyclo[5.1.0]octane-8-exo-carboxylic acid, bicyclo[6.1.0]nonane-9-exo-carboxylic acid, bicyclo[7.1.0]decane - 10-exo-carboxylic acid, bicyclo[3.1.0]hexane-6-endo - carboxylic acid, bicyclo[4.1.0]heptane-7-endo-carboxylic acid, bicyclo[5.1.0]octane-8-endo-carboxylic acid, bicyclo[6.1.0]nonane-9-endo-carboxylic acid, and bicyclo [7.1.0]decane-10-endo-carboxylic acid.

Following the procedures outlined above there are obtained the following Formula II 1-aminocyclopropacycloalkanes: 6 - exo - aminobicyclo[3.1.0]hexane, 7 - exo-aminobicyclo[4.1.0]heptane, 8 - exo-aminobicyclo[5.1.0] octane, 9-exo-aminobicyclo[6.1.0]nonane, 10-exo-aminobicyclo[7.1.0]decane, 6 - endo - aminobicyclo[3.1.0]hexane, 7 - endo-aminobicyclo[4.1.0]heptane, 8-endo-aminobicyclo[5.1.0]octane, 9-endo-aminobicyclo[6.1.0]nonane, and 10-endo-aminobicyclo[7.1.0]decane.

Following the procedure outlined above there are also obtained the following ureas of Formula X: 1,3-bis(bicyclo[3.1.0]hex - 6-exo-yl)urea, 1,3 - bis(bicyclo[4.1.0] hept - 7 - exo-yl)urea, 1,3-bis(bicyclo[5.1.0]oct-8-exo-yl) urea, 1,3 - bis(bicyclo[6.1.0]non-9-exo-yl)urea, 1,3 - bis (bicyclo[7.1.0]dec - 10 - exo-yl)urea, 1,3 - bis(bicyclo [3.1.0]hex-6-endo-yl)urea, 1,3 - bis(bicyclo[4.1.0]hept-7-endo-yl)urea, 1,3 - bis(bicyclo[5.1.0]oct-8-endo-yl)urea, 1,3 - bis(bicyclo[6.1.0]non-9-endo-yl)urea, and 1,3 - bis (bicyclo[7.1.0]dec-10-endo-yl)urea; and also the following carbamates of Formula IX ethyl bicyclo[3.1.0]hexane-6-exo-carbamate,
ethyl bicyclo[4.1.0]heptane-7-exo-carbamate,
ethyl bicyclo[5.1.0]octane-8-exo-carbamate,
ethyl bicyclo[6.1.0]nonane-9-exo-carbamate,
ethyl bicyclo[7.1.0]decane-10-exo-carbamate,
ethyl bicyclo[3.1.0]hexane-6-endo-carbamate,
ethyl bicyclo[4.1.0]heptane-7-endo-carbamate,
ethyl bicyclo[5.1.0]octane-8-endo-carbamate,
ethyl bicyclo[6.1.0]nonane-9-endo-carbamate, and
ethyl bicyclo[7.1.0]decane-10-endo-carbamate.

Suitable starting dihalides include 1,5-dichloropentane, 1,5 - dibromopentane, 3,3-dimethyl-1,5-diiodopentane, 3-ethyl-3-methyl-1,5-diiodopentane, 1,4 - diiodobutane, 1,4-dibromobutane, 2,3-dimethyl-1,4-dibromobutane, and 1,6-diiodohexane.

By reacting these dihalides with the above 1-aminocyclopropacycloalkanes, there are obtained 1-exo-piperidino-, 1-exo - 4,4-dimethylpiperidino-, 1-exo-4-ethyl-4-methylpiperidino-, 1 - exo - pyrrolidino-, 1-exo-3,4-dimethylpyrrolidino-, 1 - exo - hexamethyleneimino-, 1 - endo-piperidino-, 1-endo-4,4 - dimethylpiperidino-, 1 - endo - 4 - ethyl-4-methylpiperidino-, 1 - endo - pyrrolidino-, 1 - endo-3,4-dimethylpyrrolidino-, and 1 - endo - hexamethyleneimino-cyclopropacyclohexane, cyclopropacycloheptane, cyclopropacyclooctane, cyclopropacyclononane, and cyclopropacyclodecane, as well as the 1,1'-pentamethylene-, 1,1'-(3,3-dimethylpentamethylene)-, 1,1' - (3 - ethyl - 3-methylpentamethylene)-, 1,1'-tetramethylene-, 1,1' - (2,3 - dimethyltetramethylene)-, and 1,1'-hexamethylene-bis-quaternary ammonium halides, and the 5-halopentyl-, 5-halo-3,3-dimethylpentyl-, 5-halo-3-ethyl-3-methylhexyl, 4-halobutyl-, 4-halo-2,3-dimethylpentyl, and 6-halohexyl-monoquaternary ammonium halides thereof.

The 1-(cyclicamino)cyclopropacycloalkanes of Formula I exist either in the protonated or non-protonated forms according to the pH of the environment. When the protonated form is intended the compound is qualified as the acid addition salt; when the non-protonated form is intended it is qualified as the free base. The free bases can be converted to stable acid addition salts by neutralizing the free base with the appropriate acid to below about pH 7.0, and advantageously to about pH 2 to pH 6. Suitable acids for this purpose include hydrochloric, sulfuric, phosphoric, thiocyanic, fluosilicic, hexafluoroarsenic, hexafluorophosphoric, acetic, succinic, citric, lactic, maleic, fumaric, pamoic, cholic, palmitic, mucic, camphoric, glutaric, glycolic, phthalic, tartaric, lauric, stearic, salicylic, 3-phenylsalicylic, 5-phenylsalicylic, 3-methylglutaric, ortho - sulfobenzoic, cyclopentanepropionic, 1,2-cyclohexanedicarboxylic, 4-cyclohexanecarboxylic, octadecenylsuccinic, octenylsuccinic, methanesulfonic, benzenesulfonic, helianthic, Reinecke's, dimethyldithiocarbamic, cyclohexylsulfamic, hexadecylsulfamic, octadecylsulfamic, sorbic, monochloroacetic, undecylenic, 4'-hydroxyazobenzene-4-sulfonic, octyldecylsulfuric, picric, benzoic, cinnamic, and like acids.

The acid addition salts can be used for the same purposes as the free base or they can be employed to upgrade the same. For example, the free base can be converted to an insoluble salt, such as the picrate, which can be subjected to purification procedures, for example, solvent extractions and washings, chromatography, fractional liquid-liquid extractions, and crystallization and then used to regenerate the free base form by treatment with alkali or to make a different salt by metathesis. Or the free base can be converted to a water soluble salt, such as the hydrochloride or sulfate, and the aqueous solution of the salt extracted with various water-immiscible solvents before regenerating the free base form by treatment of the thus-extracted acid solution or converted to another salt by metathesis. The free bases can be used as a buffer or as an antacid. The thiocyanic acid addition salt when condensed with formaldehyde forms resinous materials useful as inhibitors according to U.S. Patents 2,425,320 and 2,606,155 in the acid pickling of steel. The free bases also make good vehicles for toxic acids. For example, the fluosilicic acid addition salts are useful as mothproofing agents according to U.S. Patents 1,915,334 and 2,075,359, and the hexafluoroarsenic acid and hexafluorophosphoric acid addition salts are useful as parasiticides according to U.S. Patents 3,122,536 and 3,122,552.

The compounds of Formula I also form salts with penicillins. These salts have the same antibacterial activity as the penicillins but different solubility characteristics which make them useful in situations indicated by the special solubility characteristics and in the solution and purification of the penicillins, particularly benzyl penicillin. Said salts can be formed either by neutralization of the free base form of a Formula 1, with the free acid form of a penicillin, or by a metathetical exchange of the anion of an acid addition salt of a Formula I compound, for example, the chloride ion of a hydrochloride, with the anionic form of a penicillin.

The novel free bases of Formula I are useful as catalysts for reactions between isocyanates and active hydrogen compounds, e.g., alcohols and amines, and are especially useful as catalysts for the formation of polyurethanes, e.g., polyurethane foams, by interaction of polyisocyanates and polyhydroxy compounds.

The following examples are illustrative of the process and products of the present invention but are not to be construed as limiting. The parts and percentages are by weight and the solvent ratios are by volume unless otherwise specified.

EXAMPLE 1

1-(bicyclo[3.1.0]hexan-6-exo-yl)piperidine hydrochloride (1-exo-piperidinocyclopropacylohexane hydrochloride (A) Ethyl bicyclo[3.1.0]hexane-6-exo-carbamate and 1,3-bis(bicyclo[3.1.0]hex-6-exo-yl)urea

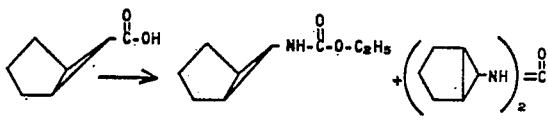

Bicyclo[3.1.0]hexane-6-exo-carboxylic acid (6.31 g., 0.05 mole), (Meinwald et al., supra), was dissolved in a mixture of 25 ml. acetone and 10 ml. water and the solution was cooled to −5° C. A solution of 6.32 g. (0.0625 mole) triethylamine in 45 ml. acetone was added slowly, followed by a solution of 6.78 g. (0.0625 mole) ethyl chloroformate in 15 ml. acetone. Stirring was continued for 30 min. Sodium azide (4.88 g. 0.075 mole) was dissolved in 30 ml. water and added dropwise. The mixture was stirred at −5° C. for 2½ hr. and then poured into cold saturated sodium chloride solution. The solution was extracted several times with ether. The extract was dried over magnesium sulfate and added to 250 ml. absolute ethanol. The ether was distilled and the remaining ethanolic solution was refluxed for 6 hr. The solvent was evaporated and the residue was treated with ether. The insoluble material was isolated by filtration and washed with ether to give 0.15 g. of 1,3-bis(bicyclo[3.1.0]hex-6-exo-yl)-urea, M.P. 235–240° C. (dec.).

*Analysis.*—Calcd. for $C_{13}H_{20}N_2O \cdot 1/6H_2O$ (percent): C, 69.91; H, 9.18; N, 12.55. Found (percent): C, 69.95; H, 9.06; N, 12.50.

The filtrate was concentrated to an oil and the crude ethyl bicyclo[3.1.0]hexane-6-exo-carbamate was used directly in the following step.

(B) Bicyclo[3.1.0]hexan-6-exoamine Hydrochloride

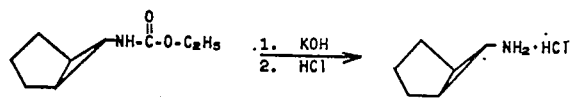

A solution of 7.7 g. (0.045 mole) of crude ethyl bicyclo[3.1.0]hexane-6-exo-carbamate in 100 ml. ethanol and 100 ml. 20% aqueous potassium hydroxide was refluxed under nitrogen for 25 hr. The reaction mixture was distilled until the distillate temperature reached 90° C. The distillate was diluted with 150 ml. ether, dried over magnesium sulfate and distilled through a 24″ spinning band column until the head temperature reached 80° C. The oily residue was dissolved in ether and the solution was dried over magnesium sulfate. Addition of ethereal hydrogen chloride precipitated 3.78 g. off-white solid, M.P. 219° C. (dec.). Two crystallizations from methanol/ether gave 3.50 g. (59%) of bicyclo[3.1.0]hexane-6-exo-amine hydrochloride as cream-colored plates, M.P. 221° C. (dec.).

*Analysis.*—Calcd. for $C_6H_{11}N \cdot HCl$ (percent): C, 53.93; H, 9.05; N, 10.48; Cl, 26.53. Found (percent): C, 53.34; H, 8.92; N, 10.12; Cl, 26.27.

The yield of the amine can be substantially improved by substituting water for ethanol in the above procedure.

The 1,3-bis(bicyclo[3.1.0]hex-6-exo-yl)urea of part A on treatment with phosgene according to U.S. Patent 3,275,669 is converted to bicyclo[3.1.0]hexan-6-exo-yl isocyanate which on hydrolysis yields bicyclo[3.1.0]hexan-6-exo-amine, which on conversion to the hydrochloride by the procedure given above yields bicyclo[3.1.0]hexan-6-exo-amine hydrochloride identical with that given above. If desired, the bicyclo[3.1.0]hexan-6-exo-yl isocyanate can be recycled to the ethanolic solution of part A prior to reflux. The isocyanate can also be reacted with 4-methylbenzenesulfonamide according to Example 15 of U.S. Patent 2,968,158 to form N-(4-methylbenzenesulfonyl)-N′-(bicyclo[3.1.0]hex-6-exo-yl)urea which is useful as a hypoglycemic agent.

(C) 1 - (Bicyclo[3.1.0]hexane-6-exo-yl)piperidine Hydrochloride

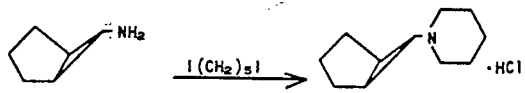

Bicyclo[3.1.0]hexan-6-exo-amine hydrochloride (3.98 g., 0.03 mole) was dissolved in water and the solution was made alkaline with sodium hydroxide. The free amine separated as an oil and was taken up in ether. The ether solution was dried over magnesium sulfate. 1,5-diiodopentane (19.4 g., 0.06 mole) and 8.29 g. (0.0105 mole) potassium carbonate were added and the suspension was gently warmed on the steam bath until most of the ether was evaporated. The residue was heated on the steam bath under nitrogen for 24 hr. Water was added and a yellow solid separated which was removed by filtration, washed with water and ether and not further identified. The filtrate was saturated with sodium chloride and extracted three times with ether. The ether solution was extracted with 0.1 N hydrochloric acid until the extract was acidic. The solution of amine hydrochloride was back-extracted with ether and then made alkaline with sodium hydroxide and saturated with sodium chloride. The amine was extracted into ether and the solution was dried over magnesium sulfate. Addition of ethereal hydrogen chloride gave 1.75 g. of 1-(bicyclo[3.1.0]-hexan-6-exo-yl)piperidine hydrochloride as a yellow solid, M.P. 240° C. (dec.). Two crystallizations from methanol/ether yielded 1.43 g. (24%) white crystals, M.P. 245° C. (dec.).

*Analysis.*—Calcd. for $C_{11}H_{19}N \cdot HCl$ (percent): C, 65.50; H, 9.99; N, 6.94; Cl, 17.57. Found (percent): C, 65.37; H, 10.18; N, 7.02; Cl, 17.34.

EXAMPLE 2

(A) 1-(bicyclo[3.1.0]hexan-6-exo-yl)pyrrolidine and 1,1′ - tetramethylene - bis - (1 - bicyclo[3.1.0]hex-6-exo-yl)pyrrolidinium iodide

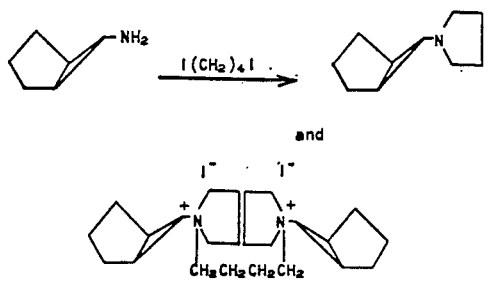

Bicyclo[3.1.0]hexan-6-exo-amine hydrochloride (15.1 g., 0.112 mole) was dissolved in water and the solution was made basic with sodium hydroxide. The free amine separated as an oil and was taken up in ether. The ether solution was dried over magnesium sulfate. The drying agent was filtered and most of the ether was removed by gently warming the filtrate on the steam bath. Absolute ethanol (100 ml.), 34.7 g. (0.112 mole) 1-4-diiodobutane, and 31.0 g. (0.22 mole) potassium carbonate were added to the residue and the suspension was stirred under nitrogen on the steam bath for 7 hours. Ethanol (50 ml.) was distilled and 100 ml. water was added. The suspension was extracted with three 75-ml. portions of ether and the extract was dried over magnesium sulfate (saved the water layer which contained some solid). The ether was evaporated and the residue was distilled through a 24″ spinning band column. After a 1.0 g. forerun, the product, 1-(bicyclo[3.1.0]hexan-6-exo-yl)-pyrrolidine, was collected as a colorless oil; 6.15 g. (36%), B.P. 82° C. (13 mm.).

*Analysis.*—Calcd. for C₁₀H₁₇N (percent): C, 79.40; H, 11.34; N, 9.26. Found (percent): C, 79.40; H, 11.35; N, 9.97.

A solid was filtered from the above water layer and washed with water. Crystallization from about 200 ml. absolute ethanol gave 3.12 g. of 1,1'-tetramethylene-bis-(1-bicyclo[3.1.0]-hex-6-exo-yl)pyrrolidinium iodide as yellow needles, M.P. 257° C. (dec.).

*Analysis.*—Calcd. for C₂₄H₄₂N₂I₂ (percent): C, 47.07; H, 6.91; N, 4.58; I, 41.44. Found (percent): C, 47.15; H, 6.87; N, 4.57; I, 41.54.

(B) 1-(bicyclo[3.1.0]hexan-6-exo-yl)pyrrolidine oxalate.

A solution of 6.15 g. (0.041 mole) of 1-(bicyclo[3.1.0]-hexan-6-exo-yl)pyrrolidine in ether was added to an ether solution of 3.69 g. (0.041 mole) oxalic acid. The resulting solid was filtered and washed with ether. Crystallization from 1:1 ethanol/ether gave 6.92 g. (70%) of 1-(bicyclo[3.1.0]-hexan-6-exo-yl)pyrrolidine oxalate as white plates, M.P. 179–181° C. (dec.).

*Analysis.*—Calcd. for C₁₀H₁₇N·C₂H₂O₄ (percent). C, 59.73; H, 7.94; N, 581. Found (percent): C, 59.88; H, 7.93; N, 5.62.

EXAMPLE 3

1-(bicyclo[3.1.0]hexan-6-endo-yl)piperidine hydrochloride (A) 1,3-bis(bicyclo[3.1.0]hex-6-endo-yl)urea and ethyl bicyclo[3.1.0]hexane-6-endo-carbamate

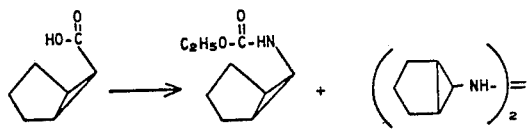

Bicyclo[3.1.0]hexane-6-endo-carboxylic acid (6.31 g., 0.05 mole), (Meinwald et al., supra), was dissolved in a mixture of 25 ml. acetone and 10 ml. water and the solution was cooled to −5° C. A solution of 6.32 g. (0.0625 mole) triethylamine in 45 ml. acetone was added slowly, followed by a solution of 6.78 g. (0.0625 mole) ethyl chloroformate in 15 ml. acetone. Stirring was continued for 30 minutes. Sodium azide (4.88 g., 0.075 mole) was dissolved in 30 ml. water and added dropwise. The mixture was stirred at −5° C. for 2½ hr. and then poured into cold saturated sodium chloride solution. The solution was extracted several times with ether. The extract was dried over magnesium sulfate and added to 250 ml. absolute ethanol. The ether was distilled and the remaining ethanolic solution was refluxed for 6 hr. The solvent was evaporated and the oily residue crystallized partially on cooling. Ether was added and the insoluble material was isolated by filtration and washed with ether to give 0.17 g. of 1,3-bis-(bicyclo[3.1.0]hex-6-endo-yl)-urea, M.P. 200–205° C. (dec.).

*Analysis.*—Calcd. for C₁₃H₂₀N₂O·1/6H₂O (percent): C, 69.91; H, 9.18; N, 12.55. Found (percent): C, 69.52; H, 8.96; N, 12.60.

The filtrate was concentrated to an oil which was treated with a small amount of Skellysolve B (technical hexane) and cooled in a solid carbon dioxide-acetone bath. Three crops of crystals were obtained which melted 38–46° C. Crystallization from Skellysolve B gave 2.60 g. (31%) ethyl bicyclo[3.1.0]hexane-6-endo-carbamate as colorless needles, M.P. 46–48° C.

*Analysis.*—Calcd. for C₉H₁₅NO₂ (percent): C, 63.88; H, 8.94; N, 828. Found (percent): C, 63.93; H, 9.08; N, 8.55.

(B) Bicyclo[3.1.0]hexan-6-endo-amine hydrochloride

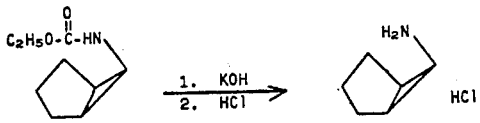

The mother liquors from the crystallization of ethyl bicyclo[3.1.0]hexane-6-endo-carbamate were combined and the Skellysolve B was evaporated. The residual oil was dissolved in 50 ml. ethanol and 50 ml. 20% aqueous potassium hydroxide and refluxed for 30 hr. The reaction mixture was distilled and 60 ml. distillate was collected, containing most of the product. The distillate was diluted with an equal volume of ether and this solution was dried twice over magnesium sulfate. The solvents were distilled through a 24″ spinning band column. The oily residue was dissolved in ether and the solution was dried over magnesium sulfate. Addition of ethereal hydrogen chloride precipitated 0.95 g. yellow solid, M.P. 185° C. (dec.). Crystallization from ethanol/ether gave 0.90 g. bicyclo[3.1.0]hexan-6-endo-amine hydrochloride as yellow plates, M.P. 189° C. (dec.).

*Analysis.*—Calcd. for C₆H₁₁N·HCl (percent): C, 53.93; H, 9.05; N, 10.48; Cl, 26.53. Found (percent): C, 54.21; H, 9.31; N, 10.68; Cl, 26.34.

The yield of the amine can be substantially improved by substituting water for ethanol in the above reaction mixture.

The 1,3-bis(bicyclo[3.1.0]hex-6-endo-yl) urea of this example, part A on treatment with phosgene according to U.S. Pat. 3,275,669 is converted to bicyclo[3.1.0]hexan-6-endo-yl isocyanate which on hydrolysis yields bicyclo[3.1.0]hexan-6-endo-amine, which on conversion to the hydrochloride by the procedure given above yields bicyclo[3.1.0]hexan-6-endo-amine hydrochloride identical with that given above. If desired, the bicyclo[3.1.0]hexan-6-endo-yl isocyanate can be recycled to the ethanolic solution of part A prior to reflux. The isocyanate can also be reacted with 4-methylbenzenesulfonamide according to Example 15 of U.S. Pat. 2,968,158 to form N-(4-methylbenzenesulfonyl)-N′-(bicyclo[3.1.0]hex-6-endo-yl) urea which is useful as a hypoglycemic agent.

(C) 1-(bicyclo[3.1.0]hexan-6-endo-yl)piperidine hydrochloride

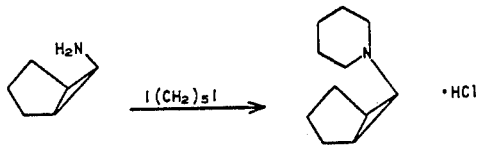

Bicyclo[3.1.0]hexan-6-endo-amine hydrochloride (0.70 g., 0.00525 mole) was dissolved in water and the solution was made alkaline with sodium hydroxide. The free amine separated as an oil and was taken up in ether. The ether solution was dried over magnesium sulfate. 1,5-diiodopentane (3.40 g., 0.0105 mole) and 1.45 g. (0.0105 mole) potassium carbonate were added and the suspension was gently warmed on the steam bath until most of the ether was evaporated. The residue was heated on the steam bath under nitrogen for 24 hr. Water was added, the solution was saturated with sodium chloride and extracted with three 15-ml. portions of ether. The ether solution was extracted with 0.1 N hydrochloric acid until the extract was acidic. The solution of amine hydrochloride was back-extracted with ether and then made alkaline with sodium hydroxide and saturated with sodium chloride. The amine was extracted into ether (three 20-ml. portions) and the solution was dried over magnesium sulfate. Addition of ethereal hydrogen chloride gave a solid which was dissolved in methanol and precipitated by the addition of ether to give 0.68 g. (64%) 1-(bicyclo[3.1.0]hexan- 6-endo-yl)piperidine hydrochloride as colorless plates, M.P. 212° (dec.).

EXAMPLE 4

(A) 1-(bicyclo[3.1.0]hexan-6-endo-yl)pyrrolidine

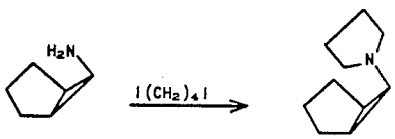

Bicyclo[3.1.0]hexan - 6 - endo - amine hydrochloride (17.1 g., 0.128 mole) was dissolved in water and the solution was made alkaline with sodium hydroxide. The free amine separated as an oil and was taken up in ether. The ether solution was dried over magnesium sulfate. The drying agent was filtered and most of the ether was removed by gently warming the filtrate on the steam bath. Absolute ethanol (100 ml.), 39.7 g. (0.128 mole) 1,4-diiodobutane, and 35.4 g. (0.256 mole) potassium carbonate were added to the residue and the suspension was stirred under nitrogen on the steam bath for 5 hours. Ethanol (50 ml.) was distilled and 100 ml. water was added. The solution was extracted with three 75-ml. portions of ether and the extract was dried over magnesium sulfate. The ether was evaporated and the residue was distilled through a 24" spinning band column. After a small forerun, the product, 1 - (bicyclo[3.1.0]hexan - 6 - endo-yl)pyrrolidine, was collected as a colorless oil; 14.3 g. (74%), B.P. 75–77° C. (12 mm.).

*Analysis.*—Calcd. for $C_{10}H_{17}N$ (percent): C, 79.40; H, 11.34; N, 9.26. Found (percent): C, 78.66, 78.63; H, 11.24, 11.07; N. 9.18.

(B) 1-(bicyclo[3.1.0]hexan-6-endo-yl)pyrrolidine oxalate

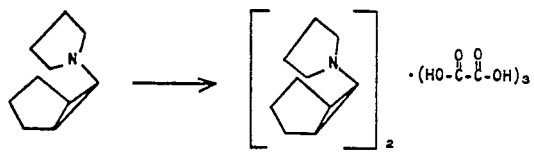

A solution of 14.3 g. (0.093 mole) of 1-(bicyclo[3.1.0]hexan - 6 - endo - yl) pyrrolidine in ether was added to an ether solution of 8.37 g. (0.093 mole) oxalic acid. The resulting solid was filtered and washed with ether. Two crystallizations from about 400 ml. 1:1 ethanol/ether gave 13.1 g. of 1 - (bicyclo[3.1.0]hexan - 6-endo-yl)pyrrolidine oxalate as white needles, M.P. 115–120° C., cloudy melt.

*Analysis.*—Calcd. for $(C_{10}H_{17}N)_2 \cdot (C_2H_2O_4)_3$ (percent): C, 54.53; H, 7.04; N, 4.89. Found (percent): C, 54.91; H, 7.09; N, 4.83.

EXAMPLE 5

Conversion of bicyclo[3.1.0]hexane-6-endo-carboxylic acid to the exo form (A) Methyl bicyclo[3.1.0]hexane - 6 - endo - carboxylate

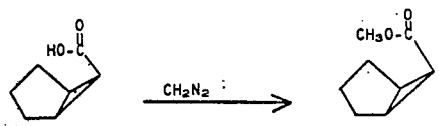

Bicyclo[3.1.0]hexane-6 - endo-carboxylic acid (189 g., 0.15 mole) was added in small portions to an ethereal solution of diazomethane, prepared from 44.1 g. (0.3 mole) N-methyl-N-nitroso-N' - nitroguanidine. The reaction mixture was allowed to stand overnight and the excess diazomethane was destroyed by the addition of acetic acid. Half the ether was distilled and the concentrated solution was extracted twice with aqueous sodium bicarbonate followed by saturated sodium chloride solution. After drying the ether layer over magnesium sulfate, the solvent was distilled on a steam bath. Distillation of the residue under reduced pressure gave 19.8 g. (94%) of methyl bicyclo[3.1.0]hexane - 6 - endo-carboxylate as a colorless oil, B.P. 71–73° C. (14 mm.); $n_D^{25}$ 1.4614.

*Analysis.*—Calcd. for $C_8H_{12}O_2$ (percent): C, 68.54; H, 8.63. Found (percent): C, 68.36; H, 8.47.

(B) Bicyclo[3.1.0]hexane - 6 - exo-carboxylic acid

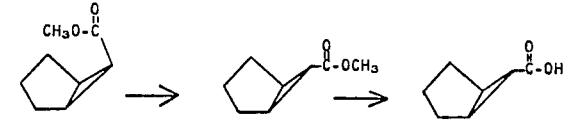

Methyl bicyclo[3.1.0]hexane - 6 - endo-carboxylate (18.3 g., 0.13 mole) was added to a solution of 9.0 g. (0.39 mole) sodium in 250 ml. absolute ethanol and refluxed for 24 hr. Water (100 ml.) was added and refluxing was continued for 4 hr. The ethanol was distilled and the residue was washed twice with ether. The aqueous phase was acidified with concentrated hydrochloric acid and refrigerated. Yellow crystals separated and were filtered and washed with water. The crude product was dissolved in Skellysolve B. The organic layer was separated from a small water layer and treated with decolorizing carbon. The resulting colorless solution was concentrated to about 40 ml. and refrigerated to yield 12.4 g. (76%) of bicyclo[3.1.0]hexane - 6 - exo-carboxylic acid as large colorless plates, M.P. 59.5–61.5° C.

The exo form can be isomerized to the endo form by the same procedure. The yields are lower, however, because the equilibrium favors the exo form.

EXAMPLE 6

1-(bicyclo[3.1.0]hexan - 6 - exo-yl)piperidine hydrochloride and exo-1-bicyclo[3.1.0]hex - 6 - yl-1-(5-iodopentyl)piperidinium iodide

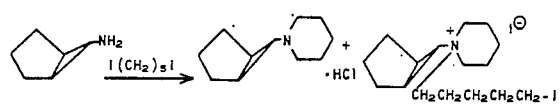

Bicyclo[3.1.0]hexan - 6 - exo-amine hydrochloride (13.4 g., 0.1 mole) was dissolved in water and the solution was made alkaline with sodium hydroxide. The free amine was taken up in ether and the ether solution was dried over magnesium sulfate. The ether was evaporated by gentle warming on the steam bath. 1,5-diiodopentane (64.8 g., 0.2 mole), potassium carbonate (27.6 g., 0.2 mole), and 100 ml. absolute ethanol were added and the mixture was stirred on the steam bath under nitrogen for 22 hrs. Most of the ethanol was distilled and water and ether were added. A material, insoluble in both phases, separated and was collected. Crystallization from ethanol gave exo-1-bicyclo[3.1.0]hex - 6 - yl-1-(5-iodopentyl)piperidinium iodide (7.45 g.) as off-white plates, M.P. 147–150° C.

*Analysis.*—Calcd. for $C_{16}H_{29}I_2N$ (percent): C, 39.28; H, 5.97; N, 2.86; I, 51.88. Found (percent): C, 40.07; H, 6.10; N, 2.72; I, 50.60.

1-(bicyclo[3.1.0]hexane - 6 - exo-yl)piperidine hydrochloride, as characterized in Example 1, part C, was isolated in 61% yield from the ether layer by the procedure of Example 1, part C.

We claim:
1. A compound of the formula

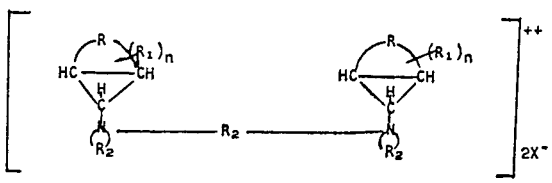

wherein R is polymethylene of 3 to 7 carbon atoms, $R_1$ is alkyl of not more than 2 carbon atoms, $n$ is zero or an integer not greater than 2, $R_2$ is lower alkylene of from 2 to 6 carbon atoms, and X is an anion.

2. A compound of the formula:

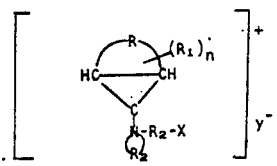

wherein R is polymethylene of 3 to 7 carbon atoms, $R_1$ is alkyl of not more than 2 carbon atoms, $n$ is zero or an integer not greater than 2, $R_2$ is lower alkylene of from 2 to 6 carbon atoms, X is halogen and Y is an anion.

3. A compound of claim 2 wherein $R_2$ is selected from the group consisting of tetramethylene, pentamethylene and hexamethylene.

4. A compound according to claim 3 wherein R is trimethylene and $n$ is zero, $R_2$ is pentamethylene, and both X and Y are iodine.

5. A compound of claim 1 wherein $R_2$ is selected from the group consisting of tetramethylene, pentamethylene and hexamethylene.

6. A compound of claim 1 wherein R is trimethylene, $n$ is zero, $R_2$ is tetramethylene and X is iodine.

References Cited
UNITED STATES PATENTS 3,164,601   1/1965   Thesing et al. ------ 260—294.7
3,258,469   6/1966   Blanchard et al. --- 260—326.8

OTHER REFERENCES

Shirley, Organic Chemistry, Holt, Rinehart and Winston, New York, p. 440.

Elderfield, "Heterocyclic Compounds, vol. 1," John Wiley & Sons, Inc., New York (1950), pp. 62, 63, 80 and 81.

HENRY R. JILES, Primary Examiner

G. T. TODD, Assistant Examiner

U.S. Cl. X.R.

252—149; 260—2.5, 75, 77.5, 239, 239.1, 271, 293.4, 294, 326.8, 453, 468, 553; 424—244, 267, 274

UNITED STATES PATENT OFFICE
CERTIFICATE OF CORRECTION

Patent No. 3,546,233          Dated December 8, 1970

Inventor(s) Jacob Szmuszkovicz and Elisabeth Cerda

It is certified that error appears in the above-identified patent and that said Letters Patent are hereby corrected as shown below:

Column 1, line 23, for "2X" read -- $2X^-$ --. Column 1, li 56, for "2X" read -- $2X^-$ --. Column 4, line 75, for "cyclopropacylcloalkanes" read -- cyclopropacycloalkanes --. Column 6, line 56, for "solution" read -- isolation --. Colun 6, line 59, for "of a Formula 1," read -- of a compound of Formula I, --. Column 7, line 3, for "piperidinocyclopropacylohexane Hydrochloride" read -- piperidinocyclopropacyclohexane Hydrochloride --. Column 7, line 38, for "exoamine" re -- exo-amine --. Column 8, line 3, for "hexane" read -- hexar Column 9, line 27, for "N, 581." read -- N, 5.81 --. Column $\underline{\text{c}}$ line 74, for "N, 828." read -- N, 8.28 --. Column 11, line 6ε for "189 g.," read -- 18.9 g., --. Column 12, line 22, for "acdified" read -- acidified --.

Signed and sealed this 29th day of August 1972.

(SEAL)
Attest:

EDWARD M. FLETCHER, JR.          ROBERT GOTTSCHALK
Attesting Officer          Commissioner of Pater